(12) United States Patent
Tam

(10) Patent No.: US 6,984,976 B1
(45) Date of Patent: Jan. 10, 2006

(54) PROCESS FOR DETERMINING THE RESISTIVITY OF A RESISTIVE LAYER

(75) Inventor: Kent K. Tam, Rowland Heights, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 23 days.

(21) Appl. No.: 11/085,463

(22) Filed: Mar. 21, 2005

(51) Int. Cl.
*G01B 7/06* (2006.01)

(52) U.S. Cl. ...................................... 324/229; 324/644

(58) Field of Classification Search ........ 324/227–230, 324/332, 337, 637–639, 644; 356/432–433, 356/445, 448
See application file for complete search history.

(56) References Cited

U.S. PATENT DOCUMENTS

| | | | |
|---|---|---|---|
| 5,012,248 A | 4/1991 | Munro et al. | 342/22 |
| 5,355,083 A | 10/1994 | George et al. | 324/229 |
| 6,788,244 B1 | 9/2004 | Tam | 342/22 |

*Primary Examiner*—Bot LeDynh
(74) *Attorney, Agent, or Firm*—Louis L. Dachs

(57) ABSTRACT

The invention is a process for determining the resistivity of a layered structure including a layer of resistive material hidden under a topcoat and a tile layer, the process comprises the steps of; 1) directing electromagnetic radiation over a selected frequency range to the outer surface of the layered structure; 2) measuring the reflection of the electromagnetic radiation from the layered structure surface; 3) converting the signal into the time domain; 4) analyzing the first echo to obtain the topcoat thickness; 5) obtaining the tile thickness from the time delay between the first and second echoes; 6) compensating the second echo with electromagnetic power loss due to the topcoat and tile; and 7) determining the resistance of the resistive layer from the compensated second echo.

5 Claims, 8 Drawing Sheets

PROCESS FOR DETERMINING THE RESISTIVITY OF A RESISTIVE LAYER

BACKGROUND OF THE INVENTION

1. Field of the Invention

The invention relates to the field of processes for measuring coating properties and, in particular, to a process for measuring the resistivity of a resistive layer of material hidden under layers of dielectric materials.

2. Description of Related Art

RAM coatings contain magnetic particles incorporated into a binder, such as urethane. The thickness and loading of the coating must be controlled in order to obtain the proper radar absorption properties. Also of importance is the ability to measure the resistivity of a resistive layer under a dielectric cover or tile. One approach is to use a hand held thickness measuring device as disclosed in U.S. Pat. No. 5,012,248 "Radar Absorption Material Thickness Measuring Device" by J. R. Munroe, et al. This invention comprises of a radiating element assembly for transmitting RF energy to and recovering reflected RF energy from the coating. A visual display is provided to indicate the thickness of the coating. A portable power supply is coupled to the detector assembly making it portable. This device is highly suitable for use in checking repairs made in the field.

It is common to apply RAM coatings by use of hand and robotic spray techniques. Since coating thickness is critical, it is desirable to check the coating thickness prior to it curing. This would make the by J. R. Munroe, et al. device unusable because of the damage to the coating that would occur upon contact of the device onto the wet surface. This problem can be avoided by the use of radiating and receiving electromagnetic transmission horns angled toward each other. The signal from the radiating horn is directed at the surface and the return signal is received by the receiving horn. Thus the measurement is limited to relatively large areas. This prevents accurate readings of significantly curved surfaces. Furthermore, it cannot be used in confined areas such as the engine inlet ducts on aircraft.

Conventional inspection techniques, such as those which use ultrasonic techniques, are unsuitable, for radar absorption is not measured, and because ultrasound does not propagate well in loaded urethane or silicon based materials. Thus it is possible that the measured thickness of the coating may be correct, but the area may not be properly loaded with magnetic materials.

In U.S. Pat. No. 6,788,244B1 Inspection Device For Radar Absorbing Materials by K. K. Tam, an inspection device is disclosed for non-contact inspection of RAM surface coatings containing radar-absorbing materials on a conductive surface or substrate. In detail, the device includes a first circuit for transmitting an electromagnetic signal to the assembly. The first circuit includes a radio frequency (RF) source of electromagnetic radiation coupled to a waveguide made of a conductive material coupled in series to a second waveguide made of a dielectric material with their longitudinal axes aligned. A second circuit is provided for receiving the portion of the electromagnetic radiation transmitted by the first circuit reflected from the assembly. The second circuit includes a third waveguide made of a conductive material coupled in series to a fourth waveguide made of a dielectric material with their longitudinal axes aligned. The second circuit further includes a RF power detector coupled to the third waveguide. Thus an electromagnetic signal is transmitted from the first waveguide to the second waveguide on to the assembly and the portion of the electromagnetic signal reflected off the assembly is received by said fourth waveguide and transmitted to said third waveguide and to the RF power detector. The longitudinal axes of the first and second waveguides are at an acute angle to the longitudinal axis of the third and fourth waveguides. This angle is preferably 10 degrees. However, this device operates on reflective magnitude only. Selective analysis of resistive layers is not possible.

In U.S. Pat. No. 5,355,083 Non Contact Sensor And Method Using Inductance And Laser Distance Measurements For Measuring The Thickness Of A Layer Of Material Over Laying A Substrate by A. R. George, et al. discloses the use of a laser to aid in the positioning of an Inductance type coating thickness measuring device. A pair of lasers is used to measure the thickness of a coating. One laser is designed such that beam passes through the coating onto the substrate wherein it is reflected back to a sensor. The second laser is designed so that its laser beam is reflected off the coating to a second sensor. A computer is used to process the two signals and thus determine the thickness of the coating. Such a system will only work when the coating is transparent to the first laser beam. It also depends upon having the laser beams in a fixed position. It would also be ineffective in a hand held device, since the two lasers will not provide sufficient feedback to obtain the proper distance from and orientation to the test surface.

Thus, it is a primary object of the invention to provide a process for determining the resistivity of a layer of resistive material.

It is another primary object of the invention to provide a process for determining the resistively of a layer of resistive material covered by a second layer of non-conductive material.

It is a further object of the invention to provide a process for determining the resistively of a layer of resistive material covered by a second layer of non- conductive material by use of time domain signal processing.

SUMMARY OF THE INVENTION

The invention is a process for determining the resistivity of a layered structure that includes a layer of resistive material hidden under a topcoat and a tile layer. In detail, the process comprises the steps of;

1. Directing electromagnetic radiation over a selected frequency range to the outer surface of the layered structure;
2. Measuring the reflection of the electromagnetic radiation from the layered structure surface
3. Converting the signal into the time domain. The topcoat reflects the first echo, the resistive layer and its junction materials reflect the second echo;
4. Analyzing the first echo to obtain the topcoat thickness;
5. Obtaining the tile thickness from the time delay between the first and second echoes;
6. Compensating the second echo for electromagnetic power loss due to the topcoat and tile; and
7. Determining the resistance of the resistive layer from the compensated second echo.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of

DESCRIPTION OF THE PREFERRED EMBODIMENT

Time domain reflectometer approaches inspections by stimulating the target or the device under test (DUT) with a narrow pulse and detecting the magnitude, shape, and delay of the echo or reflection upon impinging the DUT. Since the echo is a result of the impedance mismatch between the transmission medium and the target, analysis of the echo can be used characterize the target impedance. Time domain reflectometers are generally employed in low frequency test equipment such as the ultrasonic pulser/receiver, cable tester, and transient analyzer. Due to the low frequency nature of the stimuli, the magnitude, shape, and delay of the echo may be captured by an oscilloscope, a high-speed A/D system, or a transient digitizer. For testing in the microwave region, the electronic hardware capable of generating and capturing a narrow pulse are extremely challenging and costly to implement. However, present electronic hardware such as the network analyzer can readily accommodate continuous wave (CW) measurements in the frequency domain. Reflectivity acquired in frequency domain is a complex combination of all mismatched junctions. If the network analyzer applies a consistent incident power level or performs a normalized power measurement, the constant incident power level across the test frequency band is equivalent to a narrow pulse in the time domain.

When the frequency domain data is transformed into time domain, each mismatched junction will echo upon arrival of the incident pulse. The echo's time of flight may be used to select and isolate the junction of interest. The echo's pulse shape and magnitude may be further processed to characterize the mismatched junction.

Figure 1:
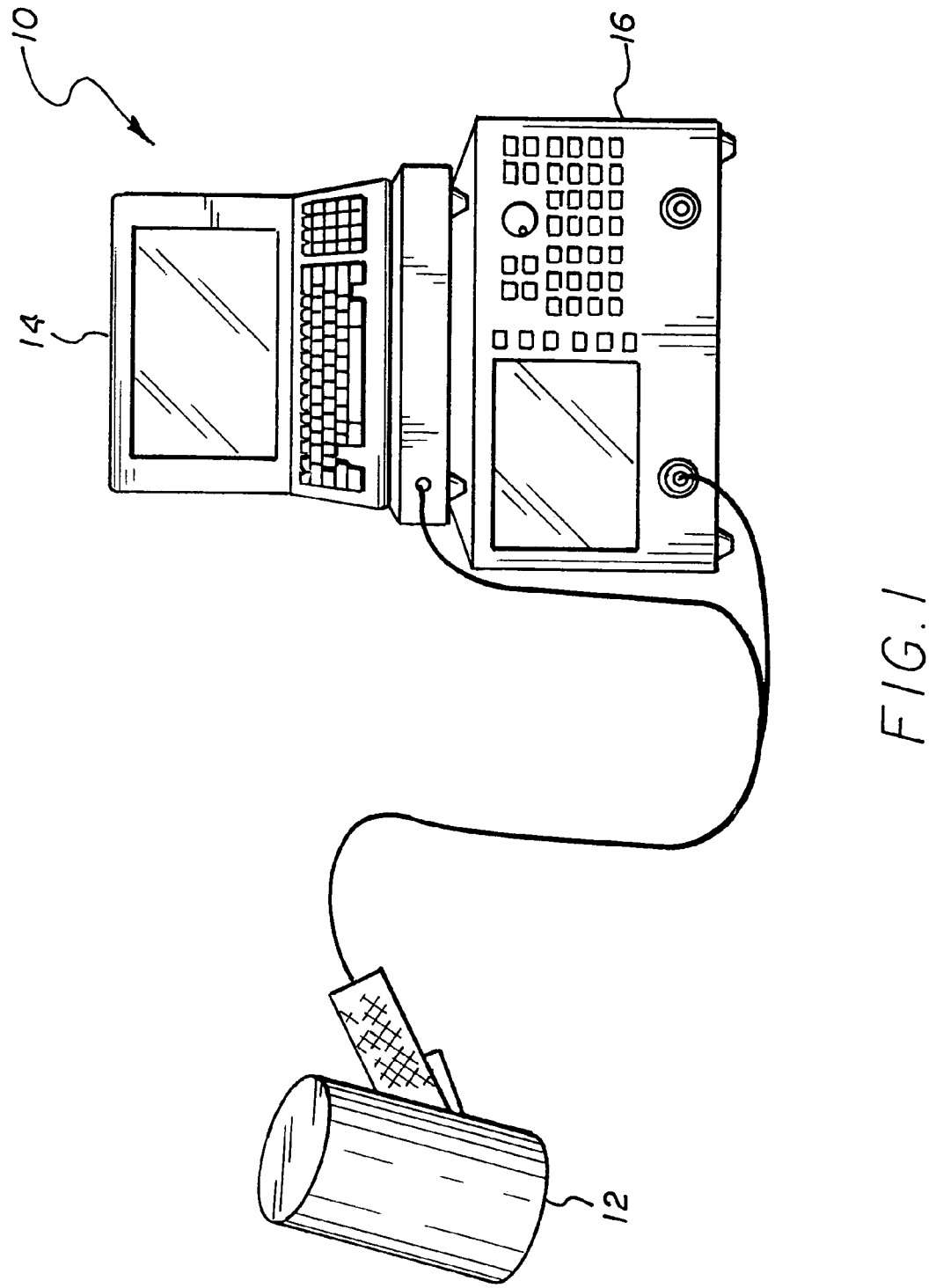
FIG. 1 is pictorial side view of a hand held RAM surface inspection device coupled to a network analyzer and notebook computer.
Figure 2:
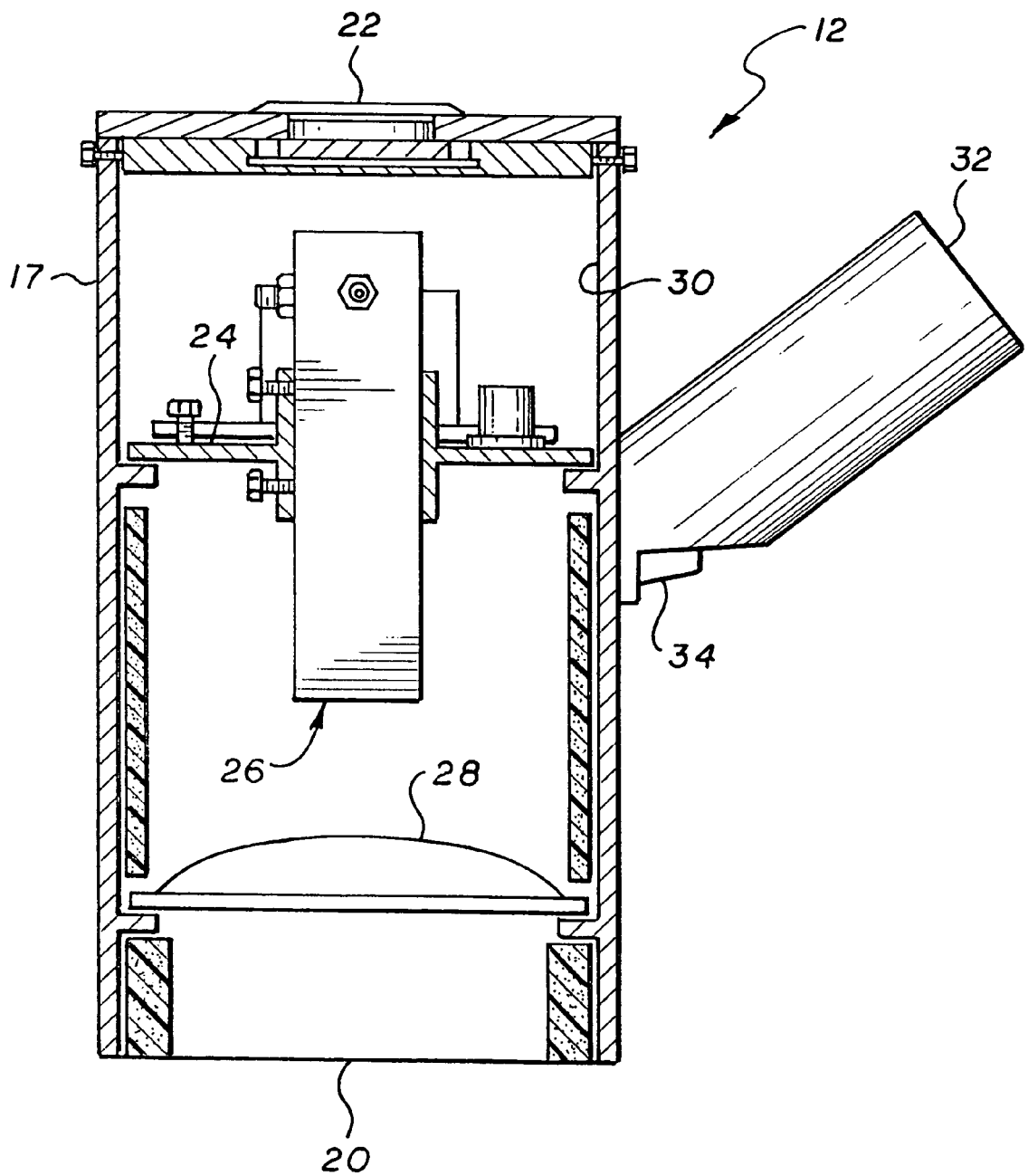
FIG. 2 is a cross-sectional view of the hand held device shown in FIG. 1

Referring to FIG. 1, it can be seen that the system, generally designated by numeral 10, includes a portable hand held probe 12 coupled to both a laptop computer 14 and a network analyzer 16. Referring to FIG. 2, the probe 12 includes a hollow housing 17 having an open first end 20 and a closed off second end 22. An internal support member 24 support a horn assembly 26 which is positioned to direct electromagnetic radiation out end 20 A lenses 28 mounted with the housing 20 near end 20 is used to focus the radiation. The interior wall 30 of the housing 17 is lined with absorbing material to prevent any dispersion of the beam from the horn assembly 26. The housing 17 includes an external handle 32 incorporating a trigger 34 for actuating the horn assembly.

Figure 3:
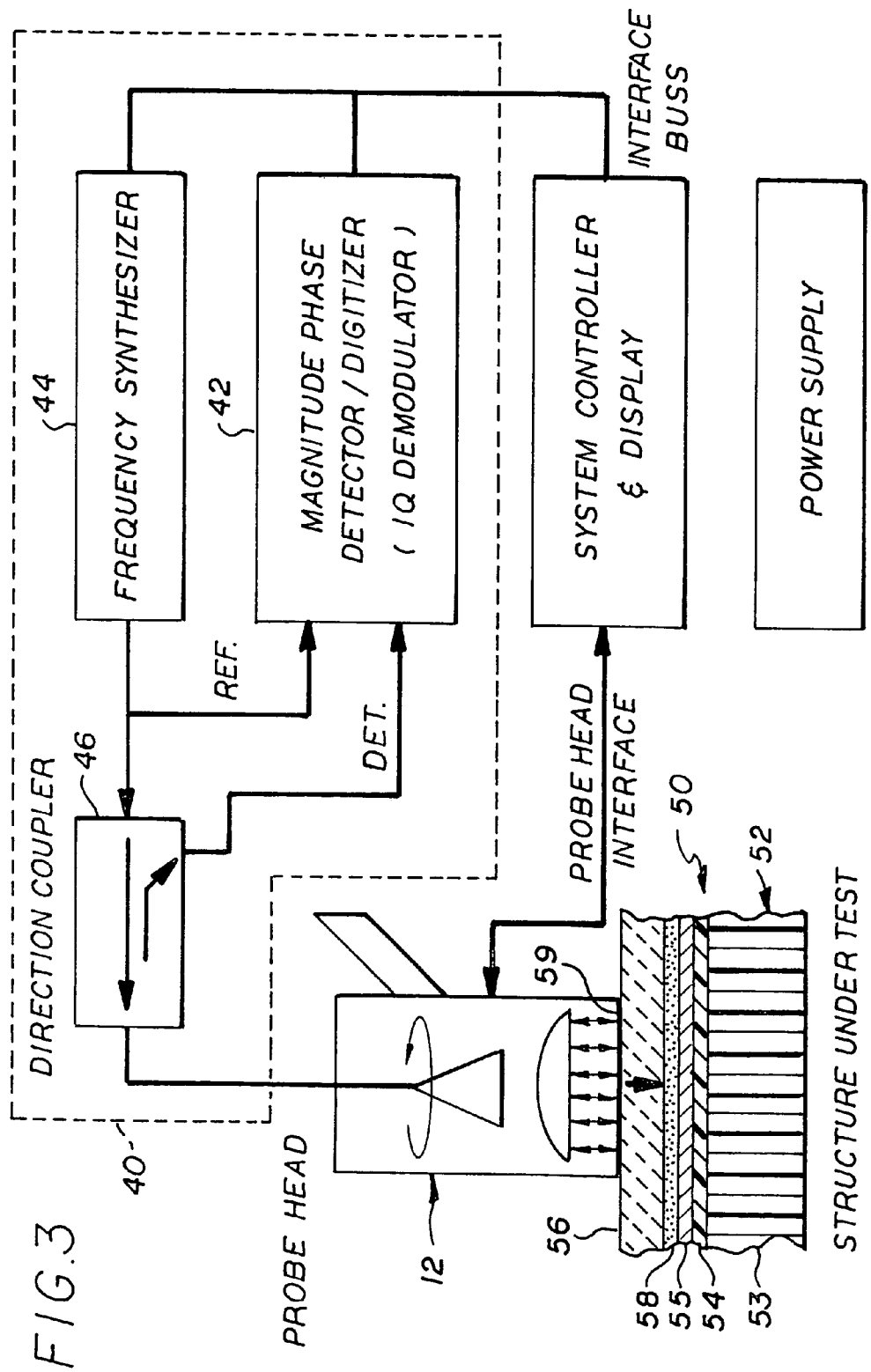
FIG. 3 is a schematic representation of the system.

The overall schematic of the system is illustrated in FIG. 3. The probe 12 is coupled to a network analyzer 40, which comprises a magnitude phase detector/digitizer (IQ Demodulator) 42, which is coupled to a frequency synthesizer 44. The out put from the synthesizer 44 is, in turn, coupled to a direction coupler 46 and provides a reference signal back to the IQ Demodulator 42. The return signal from the coupler 46 is also fed to the IQ Demodulator 42. The coupler 46 sends and receives signals from the probe 12. The probe 12, frequency synthesizer 44, IQ Demodulator 42 are all coupled to a system controller and display (laptop computer 14).

The structure under test, generally designed by numeral 50, comprises an underlying structure 52, typically honeycomb core 53, a composite panel 54, and a layer of resistive material (R card) 55 bonded to the panel 54. A tile 56 made of dielectric material is bonded to the composite panel by a layer of adhesive 58. A thin hardened top coat 59 is provided to protect the tile 56. The subject process allows the resistivity of the R-card 55 to be determined without direct physical contact.

Figure 4:
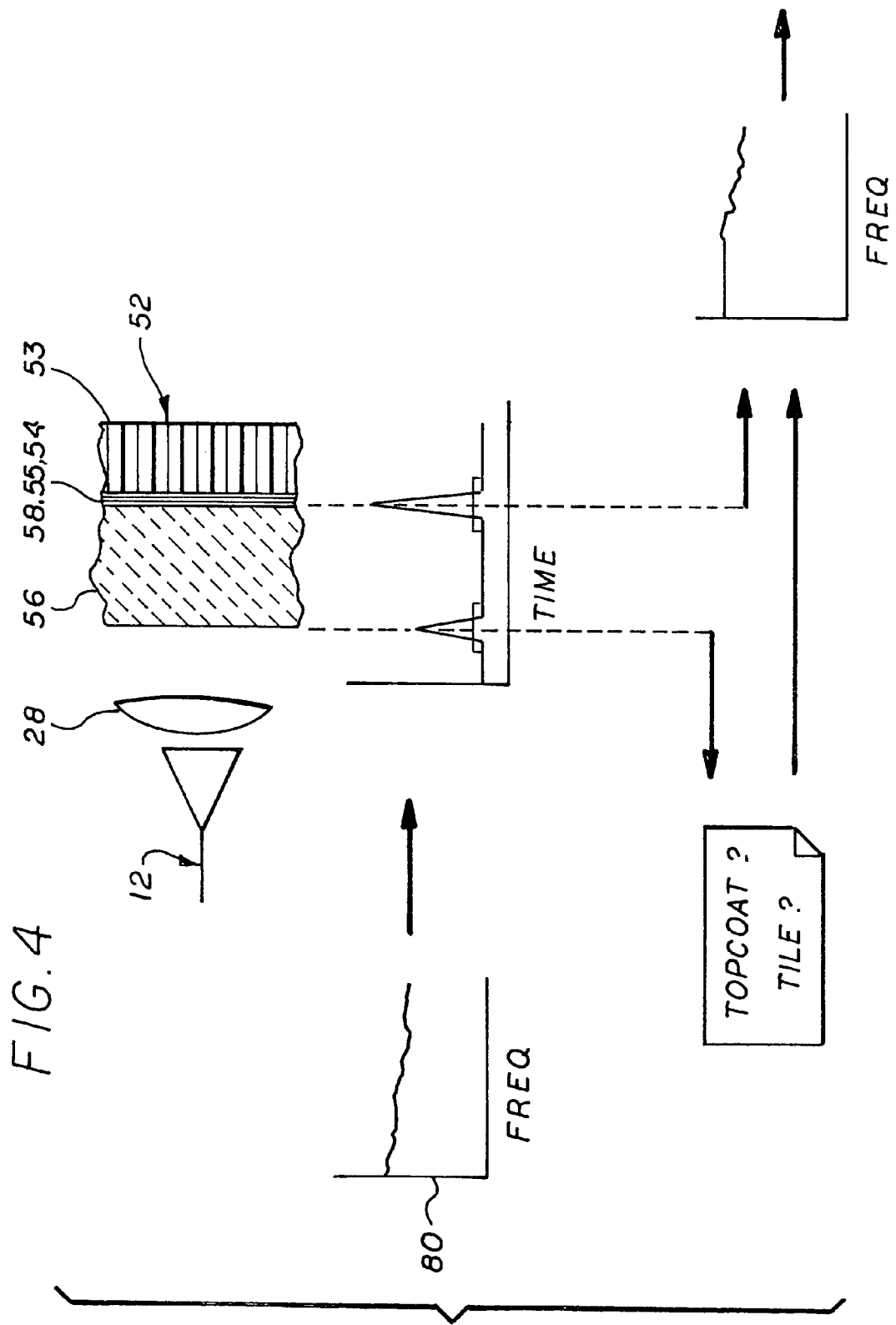
FIG. 4 is a flow chart of the process for inspection

Still referring to FIG. 3 and additionally to FIG. 4, 1 a pulse of electromagnetic radiation aimed at the structure 52.

2. The sweep frequency reflections are measured.

3. The data is then transformed into the time domain. This is will produce the graph 80 plotting reflection (Γ). Note that two large reflections are produced, one from the surface of the tile 56 due the impedance mismatch between air and the tile and a second due to mismatch in impedance between the tile and R card 55. This thickness between the tile 56 and the R card 55 is indicated by the gap between the two echoes.

Figure 5:
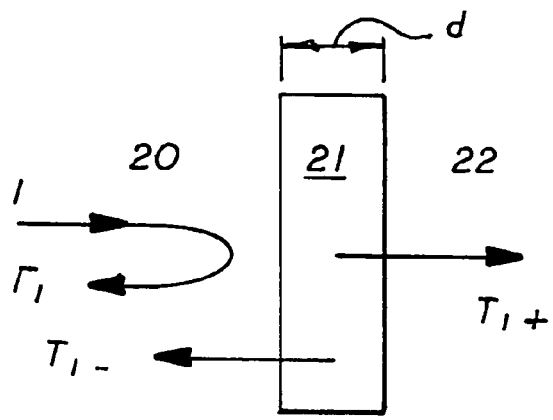
FIG. 5 is a representation of the top coat showing the reflections that are calculated.

Referring to FIG. 5, the determination of the loss due to the top coat is as follows:

$$Z_1 = Z_O * \sqrt{\epsilon_{R1}} \quad (1)$$

$$Z_2 = Z_O * \sqrt{\epsilon_{R2}} \quad (2)$$

$$T = \begin{pmatrix} A, B \\ C, D \end{pmatrix} = \begin{pmatrix} \cosh(K_1 * d), Z_1 * \sinh(K_1 * d) \\ 1/(Z_1 * \sinh(K_1 * d)), \cosh(K_1 * d) \end{pmatrix} \quad (3)$$

$$Z_{IN} = \pm \frac{1 - \Gamma_1}{1 * \Gamma_1} = \frac{A * Z_2 + B}{C * Z_2 + D} \quad (4)$$

$$T_{1+} = \frac{1}{2}(A + C * Z_O + B/Z_1 + D * Z_O/Z_2) \quad (5)$$

$$T_{1-} = \frac{1}{2}(A + C*Z_1 + B/Z_O + D*Z_2/Z_O) \quad (6)$$

Where:
$Z_O$=Free space impedance (known)
$Z_1$=Topcoat impedance (known)
$Z_2$=Tile impedance (known)
T=Tile top coat transmission matrix
$K_1$=Tile topcoat propagation factor (known)
$\epsilon_{R1}$=Tile topcoat permittivity (known)
$\epsilon_{R2}$=Tile permittivity (known)
d=Tile topcoat thickness The procedure to determine the loss due to the top coat includes the following steps:
1. Measure sweep frequency reflection
2. Transform data to time domain
3. Gate and isolate tile top coat (first echo)
4. Transform tile topcoat echo back to frequency domain
5. Compute $Z_{ZI}$ using equation 3
6. Solve for topcoat thickness (d) using equation 4
7. Compute transmission $T_{1+}$ using equation 5
8. Compute transmission $T_{1-}$ using equation 6.

Figure 6:
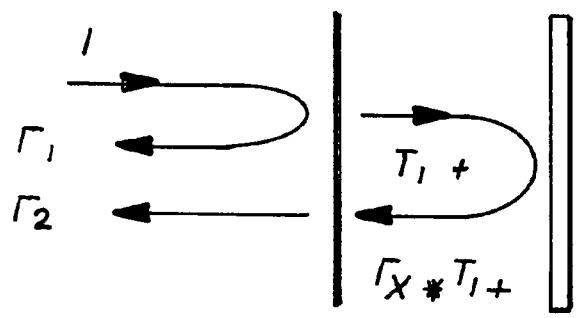
FIG. 6 is a representation of the top coat and R card showing the reflections that are calculated.

Referring to FIG. 6, the reflection off the R-card is determined by the following formulas and procedure:

$$\Gamma_2 = \Gamma_X * T_{1+} * T \quad (7)$$

$$\Gamma_X = \frac{\Gamma_2}{(T_{1+} * T_{1-})} \quad (8)$$

Figure 10:
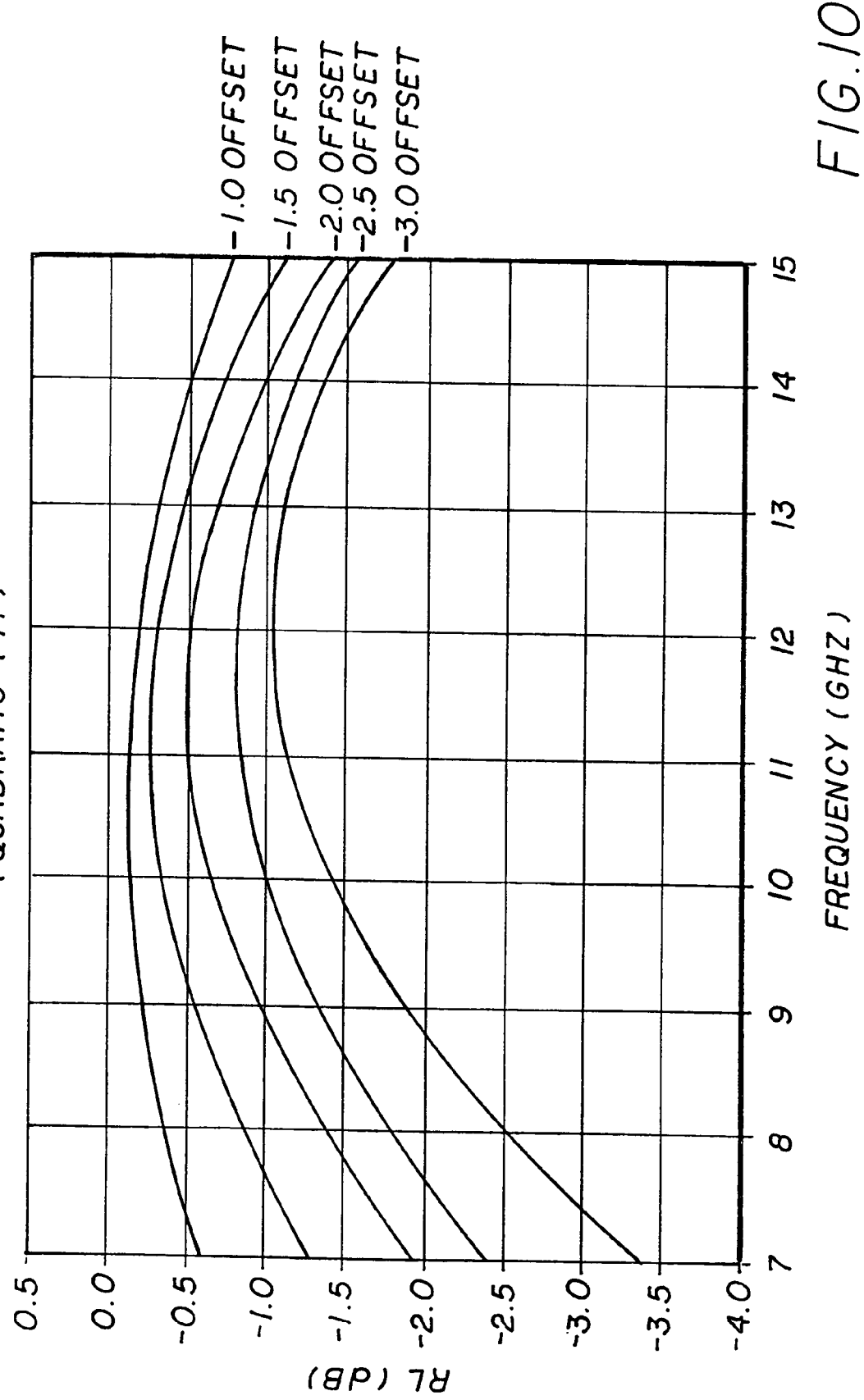
FIG. 10 is a typical graph of the reflection off a surface verses frequency for various offset distances of the sensor.

The procedure is as follows:
1. Gate and isolate R-Card ($2^{nd}$ echo) from the time domain data.
2. Transform R-Card echo ($\Gamma_2$) back to frequency domain.
3. Compute reflection of the R-Card ($T_x$) by scaling the echo with the topcoat loss ($T_1$, $T_2$) using Equation 7.
4. Compute tile thickness from $1^{st}$ and $2^{nd}$ echo separation.
6. Use the downrange correction table to determine down range loss.
7. The down range correction table is a reflection loss look up table of known resistance R-Card(s) taken at a range of distances from the sensor. It characterizes the amount of electromagnetic power drop as a function of target distance from the sensor. A typical correction table graph is presented in FIG. 10.
7. Correct reflection of the R-Card stack by adding the correction factor found in the down range table to Tx.

Figure 7:
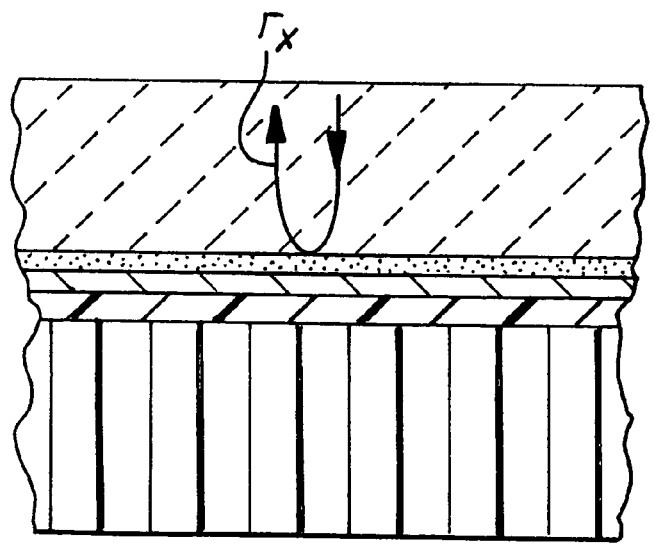
FIG. 7 is a representation of the top coat, R card, composite support panel and underlying structure showing the calculations for the R card resistivity

Referring to FIG. 7, the determination of R-card value is as follows:

$$T_X = T_3 * T_4 * T_5 = \begin{pmatrix} A_X, B_X \\ C_X, D_X \end{pmatrix} \quad (9)$$

$$T_4 = \begin{pmatrix} 1, 0 \\ 1/R_S, 1 \end{pmatrix} \quad (10)$$

$$Z_X = \pm Z_O * \left( \frac{1 - \Gamma_X}{1 + \Gamma_X} \right) \quad (11)$$

$$Z_X = \frac{(A_X * Z_5 + B_X)}{(C_X * Z_5 + D_X)} \quad (12)$$

Where:
$T_x$=R-Card transmission matrix
$T_3$=Tile transmission matrix (known)
$T_4$=R-Card transmission matrix (known)
$T_5$=Composite panel transmission matrix (known)
$Z_5$=Honeycomb core impedance (known)

The R-Card value Zx (ohms/square) is calculated by formula 12.

Figure 8:
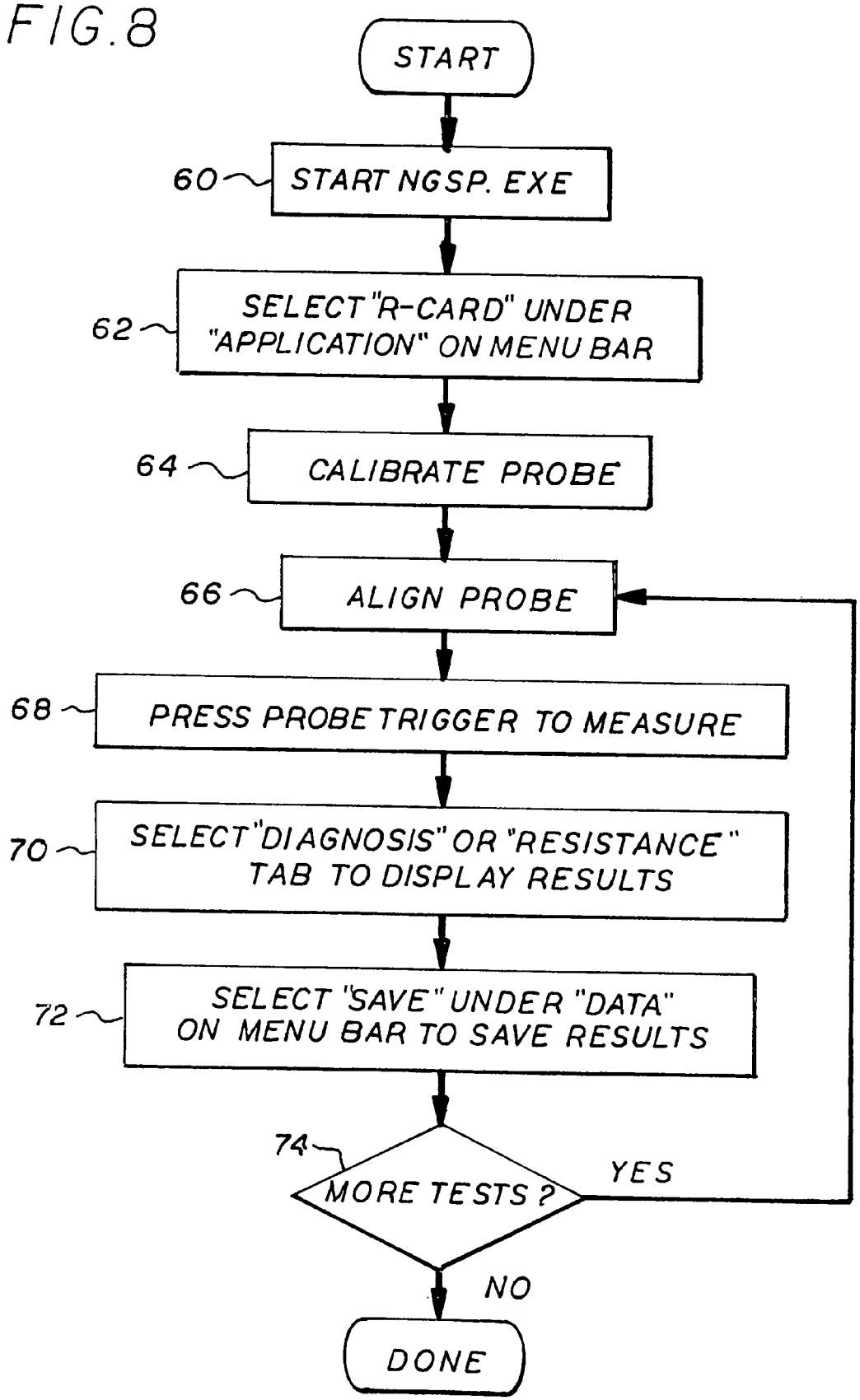
FIG. 8 is a simple flow chart of the inspection process.
Figure 9:
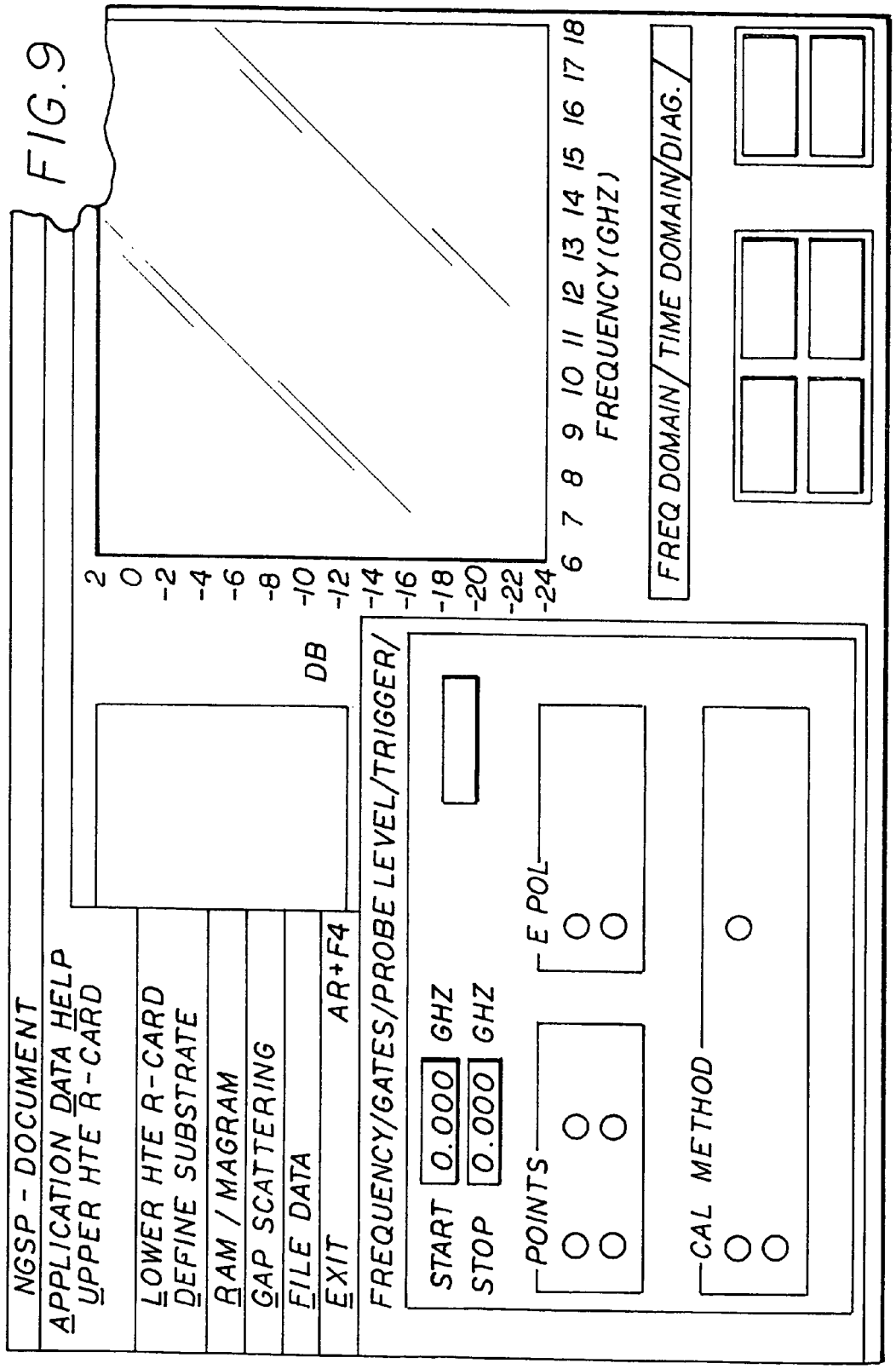
FIG. 9 is a representation of a computer screen for operating the system.

Referring to FIGS. 8 and 9, the inspection process is simple and comprises the following steps;
Step 60—Start Program.
Step 62—Select R-Card Application on menu bar.
Step 64—Calibrate probe. This involves testing using known samples.
Step 66—Align probe with specimen under test. This may require an adapter to ring be positioned between the probe and test specimen.
Step 68—Press trigger.
Step 70. Select Diagnosis or Resistance to display results.
Step 72. Select save under "Data" on Menu bar.
Step 74. Determine if more tests are necessary.

Note that the computer screen menu display is designed for this process, and variations are possible.

Test results of the subject process showed that R-Card values varying from 75 to 1200 ohms/square produced measurements varying less than 10 percent with direct DC measurements. Thus the process is offers good correlation, especially when measuring R-Card values in the 75 to 500 ohm/square range.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the inspection device manufacturing industry.

What is claimed is:
1. A process for determining the resistivity of a layered structure including a layer of resistive material hidden under a topcoat and a tile layer, the process comprises the steps of;
 directing electromagnetic radiation from a source over a selected frequency range to the outer surface of the layered structure;
 measuring the reflection of the electromagnetic radiation from the layered structure surface obtaining first and second echoes;
 converting the signal into the time domain;
 analyzing the first echo to obtain the topcoat thickness;
 obtaining the tile thickness from the time delay between the first and second echoes;

compensating the second echo for electromagnetic power loss due to the topcoat and tile; and determining the resistance of the resistive layer from the compensated second echo.

2. The process as set forth in claim 1 wherein the step of determining the resistance of the resistive layer from the compensated second echo includes the step of compensating for the distance that the source of electromagnetic radiation is from the resistive layer.

3. A process for determining the resistivity of a layered structure including a layer of resistive material hidden under a topcoat and a tile layer, the process comprises the steps of;

directing electromagnetic radiation from a source over a selected frequency range to the outer surface of the layered structure;

measuring the reflection of the electromagnetic radiation from the layered structure surface obtaining first and second echoes;

analyzing the first echo to obtain the topcoat thickness;

obtaining the tile thickness from the time delay between the first and second echoes;

compensating the second echo for electromagnetic power loss due to the topcoat and tile; and determining the resistance of the resistive layer from the compensated second echo.

4. The process as set forth in claim 3 wherein after the step of measuring the reflection of the electromagnetic radiation from the layered structure surface obtaining first and second echoes, the step of converting the signal into the time domain.

5. The process as set forth in claim 4 wherein the step of determining the resistance of the resistive layer from the compensated second echo includes the step of compensating for the distance that the source of electromagnetic radiation is from the resistive layer.

* * * * *